(12) United States Patent
Luo et al.

(10) Patent No.: US 8,621,365 B2
(45) Date of Patent: Dec. 31, 2013

(54) FILE SHARING METHOD AND SYSTEM

(75) Inventors: Wei-Wen Luo, Taipei (TW);
Wen-Chieh Tseng, Taipei (TW);
Shun-Lung Wang, Taipei (TW);
Yi-Lung Tsai, Taipei (TW); Tang-Lung Lo, Taipei (TW); Ling-Wei Hou, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 616 days.

(21) Appl. No.: 12/755,136

(22) Filed: Apr. 6, 2010

(65) Prior Publication Data
US 2011/0246894 A1    Oct. 6, 2011

(51) Int. Cl.
*G06F 3/00*  (2006.01)
*G06F 3/048* (2013.01)
*G09G 5/00*  (2006.01)
*H04B 5/00*  (2006.01)

(52) U.S. Cl.
USPC ............ 715/748; 715/733; 715/751; 345/1.2; 345/5; 455/41.1

(58) Field of Classification Search
None
See application file for complete search history.

(56) References Cited

U.S. PATENT DOCUMENTS

| 5,313,646 | A  | * | 5/1994  | Hendricks et al. | 1/1 |
| 6,721,286 | B1 | * | 4/2004  | Williams et al. | 370/282 |
| 7,701,517 | B1 | * | 4/2010  | Geronimi | 348/739 |
| 2004/0070608 | A1 |  | 4/2004  | Saka |  |
| 2004/0179040 | A1 | * | 9/2004  | Patel et al. | 345/772 |
| 2006/0010392 | A1 | * | 1/2006  | Noel et al. | 715/759 |
| 2006/0199537 | A1 | * | 9/2006  | Eisenbach | 455/41.2 |
| 2007/0143492 | A1 | * | 6/2007  | Flinchem | 709/231 |
| 2007/0285413 | A1 | * | 12/2007 | Wong et al. | 345/211 |
| 2009/0177742 | A1 | * | 7/2009  | Rhoads et al. | 709/203 |
| 2010/0138780 | A1 | * | 6/2010  | Marano et al. | 715/804 |
| 2011/0047478 | A1 | * | 2/2011  | Ellsworth | 715/747 |

* cited by examiner

*Primary Examiner* — Stephen Alvesteffer
(74) *Attorney, Agent, or Firm* — Jianq Chyun IP Office

(57) ABSTRACT

A file sharing method and a file sharing system are provided. The system includes a first file processing apparatus and a second file processing apparatus with wireless transmission function to transfer files therebetween. At first, the first file processing apparatus is coupled to the second file processing apparatus. The first file processing apparatus automatically or manually executes a file sharing software to receive desktop information of the second file processing apparatus, and the file sharing software integrates a desktop of the first file processing apparatus with the desktop information to generate a integrated desktop shown on the first file processing apparatus. The second file processing apparatus processes a file in response to a control operation of an icon on the integrated desktop.

21 Claims, 3 Drawing Sheets

FILE SHARING METHOD AND SYSTEM

FIELD OF THE INVENTION

The present invention relates to a file sharing method and system, and more particularly to an intuitive file sharing method for transferring files between computers and related file sharing system using the method.

BACKGROUND OF THE INVENTION

In the age of information explosion, information processing and transferring proceed at any time and anywhere. Notebook computers and laptop computers are highly developed to meet such environment. The efficiency of the modern notebook computers and laptop computers can compete with desktop computers because of improved hardware. Hence, many people always carry mobile computers with them and transfer a great deal of data between different computers.

There are several known methods for transferring a file between different computers. For example, the user may insert a USB flash drive to a source computer and copy the desired file, and then insert the USB flash drive to a target computer and perform a copy action again to put the file in the target computer. However, the user has to carry a flash drive as the transfer medium. If total size of the files exceeds the storage capacity of the flash drive, the flash drive must be inserted into and removed from the USB ports of the two computers many times. Hence, this method is inconvenient for transferring files more than a specific size.

An alternative method is to transfer file over network. Two computers are connected to the network in a wireless or non-wireless manner, respectively. The files may be transferred via e-mail or instant messaging software such as MSN or Yahoo messenger. However, the recipient must passively receive the files and has no choice. It is not even file sharing. Another useful file sharing method is that the source computer may upload the desired files to a FTP server and then the target computer connects to the FTP server to download the files. A more direct method is that the source computer adjusts the access right of the folder or file to be shared for designated user so that the target computer can log in to access the desired folder or file. As shown in FIG. 1, these methods provide a simplified user interface to be operated by the user to select and copy files. The user interface 100 includes two file management windows 101 and 102 for local system and remote system, respectively. Even though the two computers are connected via local area network (LAN) according to the NetBEUI protocol to transfer files without complicated settings, the files located in different computers are still listed in different explorer windows. Such operation is not intuitive enough to allow the user to establish smooth interaction between two computers.

SUMMARY OF THE INVENTION

An object of the present invention is to provide an intuitive file sharing method to share files between file processing apparatuses.

Another object of the present invention is to provide a file sharing system to share files between file processing apparatuses in a more intuitive manner.

The present invention provides a file sharing method used with a first file processing apparatus and a second file processing apparatus. At first, the first file processing apparatus is coupled to the second file processing apparatus. The desktop of the first file processing apparatus is integrated with desktop information of the second file processing apparatus to generate an integrated desktop to be shown on a display of the first file processing apparatus. The second file processing apparatus will process a file in response to a control operation of an icon on the integrated desktop shown on the display of the first file processing apparatus.

In one embodiment, the file processing apparatuses are in communication with each other wirelessly.

In one embodiment, the first file processing apparatus executes a file sharing software to receive the desktop information of the second file processing apparatus and provide the integrated desktop to be shown on the first file processing apparatus.

In one embodiment, the integrated desktop includes icons of the first file processing apparatus and the second file processing apparatus. The icons may be or may be not shown on the display of the first file processing apparatus.

In one embodiment, the file sharing software is activated automatically or manually.

In one embodiment, the control operation is performed by operating a mouse.

The present invention also provides a file sharing system. A first file processing apparatus and a second file processing apparatus are in wireless communication with each other. The file processing apparatuses execute a file sharing software. The first file processing apparatus receives desktop information from the second file processing apparatus and the file sharing software integrates the desktop of the first file processing apparatus with the desktop information to generate an integrated desktop to be shown on a display of the first file processing apparatus. The second file processing apparatus processes a file in response to a control operation of an icon on the integrated desktop.

In one embodiment, each file processing apparatus has a touch-type transparent display.

In one embodiment, the displays are arranged in a face-to-back mode or a back-to-back mode during the file sharing procedure.

In one embodiment, the file processing apparatus has a sensing module, e.g. an infrared proximity sensor, an inductive proximity sensor, a capacitive proximity sensor or an ultrasonic proximity sensor, to detect the other file processing apparatus so as to activate the file sharing software.

In one embodiment, the file processing apparatus may be a notebook computer, a laptop computer and a mobile computer.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
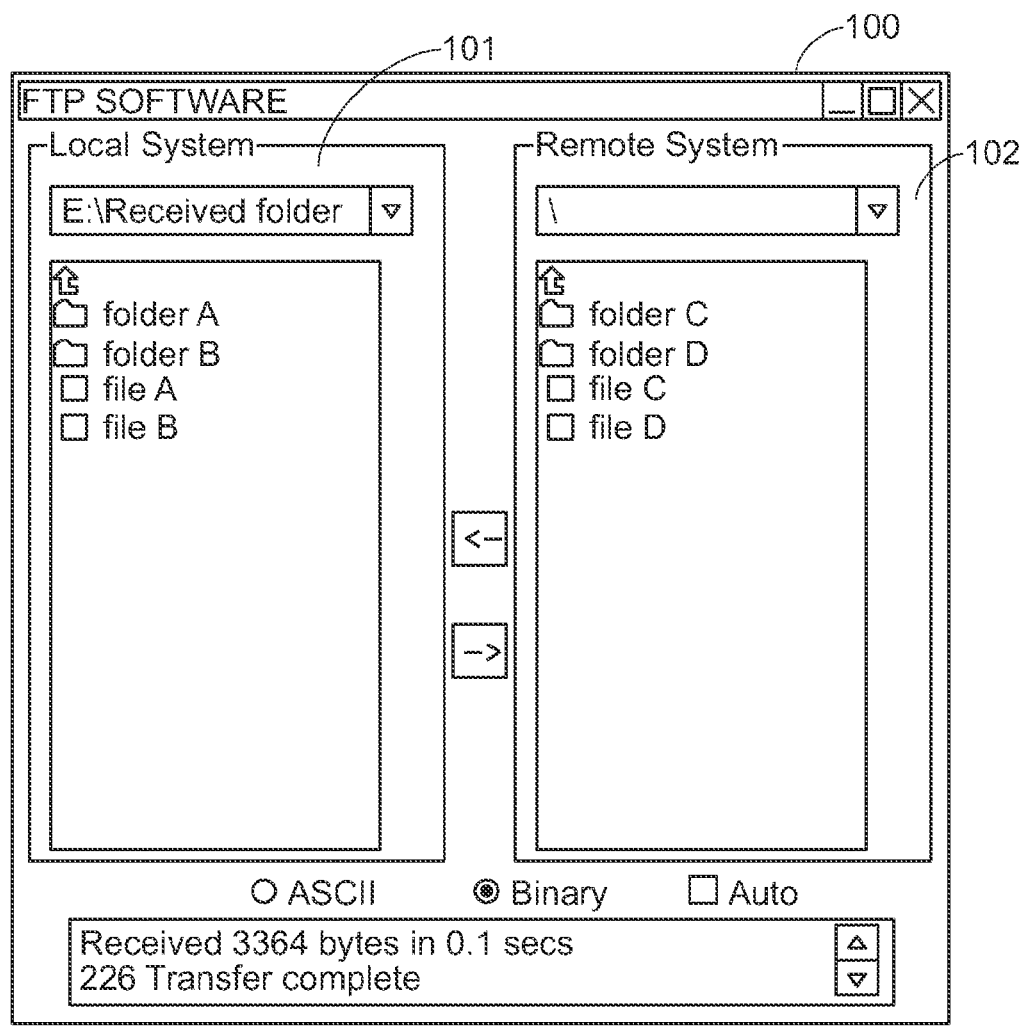
FIG. 1 is a schematic diagram illustrating a conventional user interface of a FTP software.
Figure 2A:
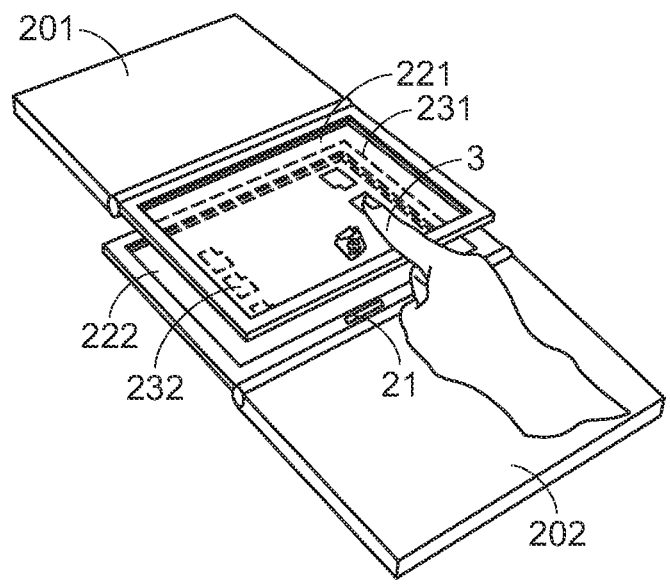
FIGS. 2A and 2B are schematic diagrams showing the relative positions of two computers during file sharing according to the present invention.
Figure 2B:
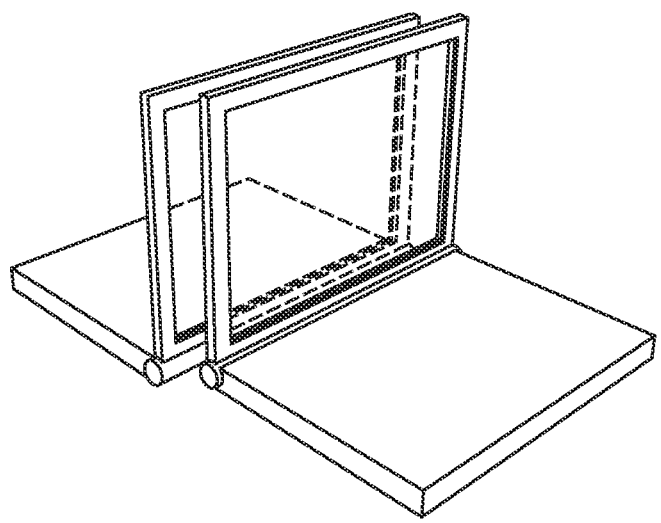

The present invention provides an intuitive file sharing method between two file processing apparatuses. The file processing apparatuses may be notebook computers, laptop computers, mobile computers and the like. Please refer to FIG. 2A, illustrating file transferring between two notebook computers 201 and 202 with wireless transmission function. The two notebook computers 201 and 202 can communicate with each other wirelessly. Each of the notebook computers 201 and 202 has a touch-type transparent display 221 (222) and a sensor 21 (only one sensor is shown). The sensor 21 may be a proximity sensor implemented by an infrared proximity sensor, an inductive proximity sensor, a capacitive proximity sensor or an ultrasonic proximity sensor. In an embodiment, the proximity sensors are disposed on the periphery of the transparent display 221 (222) or the main body of notebook computer 201 (202). When the two notebook computers 201 and 202 are close enough, the sensor 21 can detect the presence of the other notebook computer and determines to activate a file sharing software previously installed in the notebook computer 201 (202). The transparent displays 221 and 222 may be arranged in a face-to-back mode as shown in FIG. 2A or a back-to-back mode as shown in FIG. 2B. The transparent displays 221 and 222 allow the user to see the desktop shown on the other notebook computer therethrough.

In FIG. 2A, the transparent displays 221 and 222 show several icons 231 and 232. Each of the icons 231 and 232 represents a folder or a file. Once the file sharing software is activated, the two notebook computers transmit their desktop information to each other. In other words, although the icons 232 of the lower notebook computer 202 are not shown on the upper transparent display 221, the upper notebook computer 201 is aware of the existence of the icons 232. That is, the file sharing software considers that there are virtual icons located at the left side of the desktop shown on the upper transparent display 221.

The user can operate file sharing in a quite intuitive manner. The file sharing software selects, copies or deletes files in response to the control operation by the user. For example, the user's finger 3 touches the icon 231 on the upper transparent display 221 to select a specific folder or file. If the user wants to copy the selected folder or file from the upper notebook computer 201 to the lower notebook computer 202, the user may double tap the icon or drag the icon toward the desktop edge to make the file sharing software execute the copy action by means of the wireless transmission function. On the contrary, if the user wants to copy a folder or file from the lower notebook computer 202 to the upper notebook computer 201, the user selects the icon by touching the upper transparent display 221 at the position corresponding to the icon to be selected. It means that the corresponding virtual icon is selected. The file sharing software downloads the folder or file from the lower notebook computer 202 in response to the drag operation. Besides, the folder or file can be deleted by touching and dragging the corresponding (virtual) icon to the recycle bin 241 no matter whether the folder or file is stored in the upper notebook computer 201 or the lower notebook computer 202.

It should be noted that the words "upper" and "lower" are used to clearly explain the file sharing principle between two notebook computers arranged as shown in FIG. 2A. The relative position of the notebook computers is not limited to horizontal overlap. Therefore, the upper position and the lower position are not the necessary limitations of the notebook computers.

Figure 3:
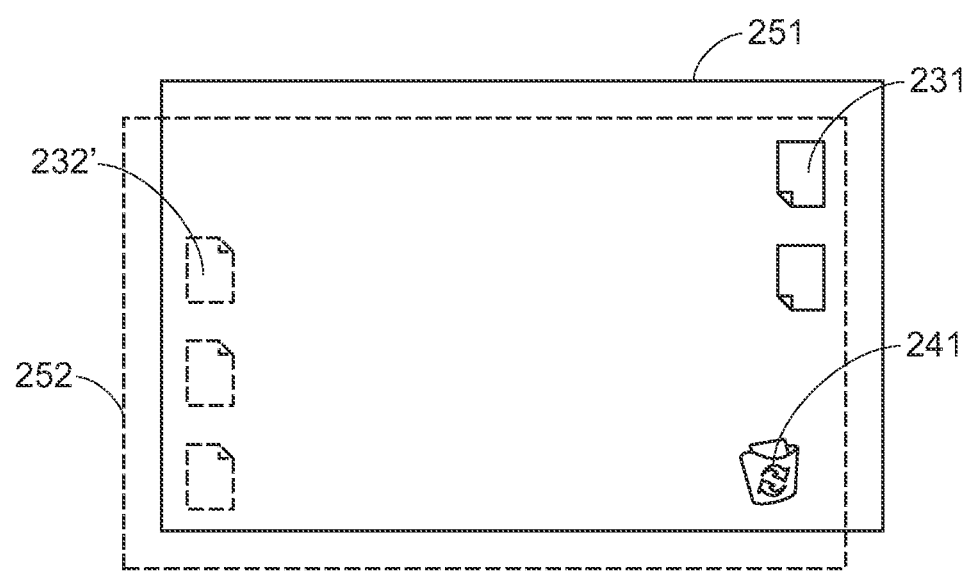
FIG. 3 is a schematic diagram showing the integrated desktop shown on the notebook computer according to the present invention.

In order to assist the user in the intuitive operation, the virtual icons may be shown on the display 221. Please refer to FIG. 3 illustrating an integrated desktop shown on the display 221. After the notebook computer 201 receives the desktop information of the notebook computer 202, the file sharing software integrates the desktop information with the desktop of the notebook computer 201 and shows the integrated desktop. In FIG. 3, the integrated desktop includes the desktop 251 (enclosed by solid line) of the notebook computer 201 and the desktop 252 (enclosed by dashed line) of the notebook computer 202. The backgrounds of the desktops shown on the two notebook computers 201 and 202 have been removed for clear purpose. The two desktops 251 and 252 may fully or partially overlap each other and all icons 231 and 232' are arranged in the overlap region. The brightness, color contrast or resolution of the icons 232' belonging to the remote computer is slightly adjusted so that the user can visually distinguish the icons 232' on the desktop 252 from the icons 231 on the desktop 251. Hence, it is more convenient and intuitive for the user to select, copy or delete the file of both notebook computers 201 and 202 to avoid touching wrong position. In an alternative approach, the icons 231 and icons 232' are grouped at different corners or opposite sides of the integrated desktop. For example, the icons 231 and icons 232' are arranged at the right side and the left side of the integrated desktop, respectively, viewed from the display 221 of the operated notebook computer 201. On the other hand, in the back-to-back mode, the icons 231 and icons 232' are arranged at the left side and the right side of the integrated desktop, respectively, viewed from the display 222 of the remote notebook computer 202. Hence, the user may remember that the icons at the right side of the desktop belong to the local notebook computer and the left side of the desktop belongs to the remote notebook computer. The operations in detail have been described in the previous paragraphs and repetitious description is not given here. The file sharing software continues refreshing the integrated desktop during the file sharing procedure.

When the file sharing software provides the integrated desktop, it is not necessary to see the other display through the local display. Hence, the method can be applied to the conventional computer including notebook computer, laptop computer, mobile computer with wireless transmission function and the like without transparent display. Besides, the operations may be performed by a cursor input device such as a mouse. To click, double click or drag an icon is undoubtedly a familiar action for any user. Compared with the conventional file management window, the present file sharing method provides the user with a more intuitive operation mode.

In one embodiment, the file sharing software is activated manually by the user. This implementation eliminates the use of the proximity sensor. When two computers are ready for exchanging files, the user activates the file sharing software installed in these computers. Then, the two computers can search each other by taking advantage of the wireless transmission function, even though the two computers are not adjacent to each other. Therefore, it is possible to share file at two ends of the office or in different rooms, under the condition that the computers are located within the wireless transmission range. If necessary, an authentication may be required before the file sharing software integrates the desktops to show integrated desktops on the displays of the computers.

From the above description about the file sharing operation, the present invention is applicable to managing multimedia files between different computers. The file sharing method makes the operation more intuitive because an integrated desktop is provided and the user has not to consider which window is local window or remote window as the prior art. According to the present invention, the icons belonging to different computers can be easily distinguished based on the position and/or the color level of the icons. Hence, multimedia files such as photos and video clips which usually involve tens or hundreds files stored in different computers may be conveniently managed in a quite intuitive manner.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A file sharing method used with a first file processing apparatus having a first touch display and a second file processing apparatus having a second touch display, the file sharing method comprising steps of:
   using a first proximity sensor by the first file processing apparatus to detect the second file processing apparatus;
   when the second file processing apparatus is within range of the first proximity sensor:
      performing direct communication or transmission between the first file processing apparatus and the second file processing apparatus;
      integrating a first desktop of the first file processing apparatus with desktop information of the second file processing apparatus to generate a first integrated desktop;
      showing the first integrated desktop on the first touch display; and
      the second file processing apparatus processing a file in response to a control operation of a first icon on the first integrated desktop shown on the first touch display,
   wherein the first touch display and the second touch display are arranged in a face-to-back mode during a file sharing procedure.

2. The file sharing method according to claim 1 wherein the first file processing apparatus is coupled to the second file processing apparatus via wireless transmission.

3. The file sharing method according to claim 1, further comprising a step of receiving the desktop information from the second file processing apparatus.

4. The file sharing method according to claim 1, further comprising a step of executing a file sharing software in the first file processing apparatus and the second file processing apparatus to generate the first integrated desktop.

5. The file sharing method according to claim 4 wherein the file sharing software is activated when the first file processing apparatus and the second file processing apparatus detect each other.

6. The file sharing method according to claim 4 wherein the file sharing software is manually activated.

7. The file sharing method according to claim 1 wherein the desktop information of the second file processing apparatus includes an initial position of at least one icon.

8. The file sharing method according to claim 7 wherein the at least one icon is shown on the first touch display at a position corresponding to the initial position.

9. The file sharing method according to claim 7 wherein the at least one icon is shown on the first touch display at a predetermined position.

10. The file sharing method according to claim 7 wherein the at least one icon is a virtual icon not shown on the first touch display.

11. The file sharing method according to claim 1 wherein the control operation of the first icon is a touch action, a double tap action or a drag action.

12. The file sharing method according to claim 1 wherein the control operation is performed by operating a mouse.

13. The file sharing method according to claim 1 wherein the file is processed by selecting the file, copying the file from/to the first file processing apparatus or deleting the file.

14. The file sharing method according to claim 1, further comprising steps of:
   integrating a second desktop of the second file processing apparatus with desktop information of the first file processing apparatus to generate a second integrated desktop;
   showing the second integrated desktop on the second touch display; and
   the first file processing apparatus processing a file in response to a control operation of a second icon on the second integrated desktop shown on the second touch display.

15. The file sharing method according to claim 1 further comprising
   using a second proximity sensor by the second file processing apparatus to detect the first file processing apparatus and performing direct data transfer between the first file processing apparatus and the second file processing apparatus only when the first file processing apparatus is within range of the second proximity sensor and the second file processing apparatus is within range of the first proximity sensor.

16. A file sharing system, comprising:
   a first file processing apparatus having a first proximity sensor and a first touch display;
   a second file processing apparatus in direct communication or transmission with the first file processing apparatus and having a second touch display when the second file processing apparatus is within the range of the first proximity sensor; and
   a file sharing software executed by the first file processing apparatus and the second file processing apparatus to integrate a first desktop of the first file processing apparatus with desktop information of the second file processing apparatus to generate a first integrated desktop shown on the first touch display wherein the second file processing apparatus processes a file in response to a control operation of a first icon on the first integrated desktop shown on the first touch display, wherein the first touch display and the second touch display are arranged in a face-to-back mode during a file sharing procedure.

17. The file sharing system according to claim 16 wherein each of the first file processing apparatus and the second file processing apparatus has a sensing module to detect each other to activate the file sharing software.

18. The file sharing system according to claim 17 wherein the sensing module is a proximity sensor, comprising an infrared proximity sensor, an inductive proximity sensor, a capacitive proximity sensor or an ultrasonic proximity sensor.

19. The file sharing system according to claim 16 wherein each of the first file processing apparatus and the second file processing apparatus is a notebook computer, a laptop computer and a mobile computer.

20. A file sharing method used with a first file processing apparatus having a first touch display and a second file processing apparatus having a second touch display, the file sharing method comprising steps of:

using a first proximity sensor by the first file processing apparatus to detect the second file processing apparatus;

when the second file processing apparatus is within range of the first proximity sensor:

performing direct communication or transmission between the first file processing apparatus to and the second file processing apparatus;

integrating a first desktop of the first file processing apparatus with desktop information of the second file processing apparatus to generate a first integrated desktop;

showing the first integrated desktop on the first touch display; and the second file processing apparatus processing a file in response to a control operation of a first icon on the first integrated desktop shown on the first touch display, wherein the first touch display and the second touch display are arranged in a back-to-back mode during a file sharing procedure.

21. A file sharing system, comprising:

a first file processing apparatus having a first proximity sensor and a first touch display;

a second file processing apparatus in direct communication or transmission with the first file processing apparatus and having a second touch display when the second file processing apparatus is within the range of the first proximity sensor; and a file sharing software executed by the first file processing apparatus and the second file processing apparatus to integrate a first desktop of the first file processing apparatus with desktop information of the second file processing apparatus to generate a first integrated desktop shown on the first touch display wherein the second file processing apparatus processes a file in response to a control operation of a first icon on the first integrated desktop shown on the first touch display, wherein the first touch display and the second touch display are arranged in a back-to-back mode during a file sharing procedure.

* * * * *